United States Patent [19]

Holzapfel

[11] 4,413,905
[45] Nov. 8, 1983

[54] LASER RANGE METER

[75] Inventor: Wolfgang Holzapfel, Bruchkoebel, Fed. Rep. of Germany

[73] Assignee: Honeywell Inc., Minneapolis, Minn.

[21] Appl. No.: 62,848

[22] Filed: Aug. 1, 1979

[30] Foreign Application Priority Data

Aug. 8, 1978 [DE] Fed. Rep. of Germany ....... 2834660

[51] Int. Cl.³ .............................................. G01C 3/08
[52] U.S. Cl. ....................................... 356/5; 307/425;
356/4.5; 356/28; 356/28.5; 356/349; 356/358;
364/819
[58] Field of Search ...................... 356/5, 28, 28.5, 4.5,
356/349, 358; 364/819, 565; 343/17.2 R, 17.5;
307/425

[56] References Cited

U.S. PATENT DOCUMENTS

| 3,445,668 | 5/1969 | Armstrong. | |
|---|---|---|---|
| 3,453,429 | 7/1969 | Duguay et al. | |
| 3,497,703 | 2/1970 | Weber. | |
| 3,503,682 | 3/1970 | Botcherby | 356/4 |
| 3,669,541 | 6/1972 | Duguay. | |
| 3,676,003 | 7/1972 | Naiman et al. | 356/5 |
| 3,737,231 | 6/1973 | Low et al. | |
| 3,749,475 | 7/1973 | Shupe | 307/425 |
| 3,779,631 | 12/1973 | Shupe | 307/425 |
| 4,093,380 | 6/1978 | White | 356/5 |
| 4,097,148 | 6/1978 | Fry. | |
| 4,167,329 | 9/1979 | Jelalian et al. | 356/5 |

OTHER PUBLICATIONS

Klauder, et al., "Correlation Effects in the Display of Picosecond Pulses by Two-Photon Techniques", (Sep. 1968).
Weber, et al., "Intensity Interferometry by Two-Photon Excitation of Fluorescence," *IEEE J. Quant. Electr.*, QE-4, p. 1009.
Lauberau, et al., "Frequenzmodulation und Kompression ultrakurzer Lichtimpulse," *Z. Naturforsch*, vol. 25A, p. 1626, (1970).
Rowe, et al., "Theory of Two-Photon Measurement of Laser Output," ;i IEEE J. Quant. Electr., QE-6, p. 49, (Jan. 1970).
Von der Linde, "Experimental Study of Single Picosecond Light Pulses," *IEEE J. Quant. Electr.*, QE-8, p. 328, (Mar. 1972).
DeMaria, et al., "Ultrakurze Laserimpulse-Werkzeuge fur die Forschung," *Umschau*, vol. 72, p. 241, (Aug. 1972).
Moran, et al., "Interferometric Measurements of the Nonlinear Refractive Index-Relative to $CS_2$ in Laser-- System-Related Materials," *IEEE J. Quant. Electr.*, QE-11, p. 259, (Jun. 1975).
Fricke, "Ultrakurze Laserpulse I u.II," *Physik unserer Zeit*, No. 3, 84 bzw., No. 4, 114, (Jul. 7, 1976).

*Primary Examiner*—S. C. Buczinski
*Attorney, Agent, or Firm*—Charles L. Rubow

[57] ABSTRACT

A laser range meter utilizing a mode locked laser for transmitting ultrashort pulses toward a target and a receiver for cross correlating the pulses returned from a target with corresponding reference pulses derived from the transmitted pulses is disclosed. Cross correlation is accomplished with a nonlinear element which responds to the return and reference pulses by producing secondary radiation of longer duration and of an intensity indicative of the time correlation of the pulses. The secondary radiation is sensed with a photodetector whose output signal is supplied to an output device.

15 Claims, 3 Drawing Figures

LASER RANGE METER

BACKGROUND OF THE INVENTION

The present invention relates generally to range measuring apparatus and, more specifically, to laser range meters of the type employing a mode locked laser transmitter.

Construction and theory of operation of a mode locked laser are known, as briefly described in De-Maria, "Mode Locking Opens Door to Picosecond Pulses," *Electronics*, p. 112 (Sept. 16, 1968). Such lasers are capable of producing ultrashort high peak power pulses which, among other things, can be used for range measurement. It is further known that, in range measuring methods based on pulse travel time, range resolution improves with decreasing pulse duration. Nevertheless, mode locking lasers to date have not been used as transmitter oscillators in range measuring equipment primarily because ultrashort duration pulses cannot be directly utilized by relatively low speed optical/electronic components and devices available for constructing suitable receivers. For example, the time constants of even the fastest optical detectors presently available, such as avalanche or PIN photodiodes, are one to two orders of magnitude longer than the duration of a light pulse from a mode locked laser.

It is pointed out that optical correlation measurement methods using nonlinear optical elements are known, as shown by the following references:

Fricke, "Ultrakurze Laserpulse I u.II," *Physik unserer Zeit*, Nr. 3,84 bzw. Nr. 4,114 (July 7, 1976)

Rowe, et al, "Theory of Two-Photon Measurement of Laser Output," *IEEE J. Quant. Electr.*, QE-6, p.49 (Jan. 1970).

Klauder, et al, "Correlation Effects in the Display of Picosecond Pulses by Two-Photon Techniques," "*Applied Physics Letters*, Vol. 13, p. 174 (Sept. 1968)"

Weber, et al, "Intensity Interferometry by Two-Photon Excitation of Fluorescence," *IEEE J. Quant. Electr.*, QE-4, p. 1009 (Dec. 1968)

Moran, et al, "Interferometric Measurements of the Nonlinear Refractive Index-Relative to CS$_2$ in Laser-System-Related Materials," *IEEE J. Quant. Electr.*, QE-11, p. 259 (June 1975)

Von der Linde, "Experimental Study of Single Picosecond Light Pulses," *IEEE J. Quant. Electr.*, QE-8, p. 328 (Mar. 1972)

However, the described uses are for the detection and-/or determination of pulse duration of ultrashort pulses, rather than the cross correlation of a measuring pulse and a reference pulse delayed in an optical delay element.

For purposes of the present invention, as well as the referenced measurement methods, an essential characteristic of nonlinear optical correlator elements is that the secondary radiation emission last several orders of magnitude longer than the primary laser pulse. This permits a radiation detector, despite its considerable time constant as compared to the laser pulse duration, to reliably convert the output signal of the optical correlator into an electrical signal.

One suitable nonlinear optical element operates on a two-photon-absorption fluorescent (TPF) effect, and utilizes fluorescent dyes such as Rhodamin 6G in ethyl alcohol solution or 1,2,3,6-dibenyanthrazen which exhibit especially good absorption characteristics for second harmonic laser light frequencies. The fluorescence yield of these dyes is proportional to the square of the light intensity because two photons of laser light are used for each atomic absorption process.

Another suitable nonlinear optical element operates on a frequency doubling or second harmonic generation (SHG) effect, and utilizes optically nonlinear crystals, such as KDP, ADP, or lithium niobate, as a laser light detector. Such crystals have polarization properties which are dependent on the square of the strength of the electrical field. As a result of the interaction with laser light, second harmonic frequency radiation is generated, with two photons of laser radiation generating one photon of secondary radiation. In addition to these methods, the use of other detection methods is also possible.

Accordingly, the present invention resides in a system concept and apparatus for a high resolution laser range meter capable of fully utilizing the extremely short pulse duration of a mode locked laser to provide improved measuring accuracy.

SUMMARY OF THE INVENTION

The invention comprises a mode locked laser transmitter for radiating ultrashort measuring pulses of very high intensity and a receiver in which reflected or return pulses are optically cross correlated with a reference pulse. The optical cross correlator includes a delay element in which the reference pulse is delayed by the travel time of the measuring pulse, and a nonlinear optical element which responds to the influx of laser light by generating a second harmonic secondary radiation of a duration several orders of magnitude longer than the original laser pulse. A photodetector may be utilized to convert the secondary radiation into an electrical output signal proportional to the radiation impinging on the nonlinear element. Means is provided for varying the reference pulse delay time so as to produce the maximum value of photoelectric current. The delay time is then proportional to the travel time of the measuring pulse. Suitable nonlinear optical elements include two-photon-absorption fluorescent (TPF) dyes, and second harmonic generation (SHG) devices for frequency doubling.

DESCRIPTION OF THE PREFERRED EMBODIMENTS

Figure 1:
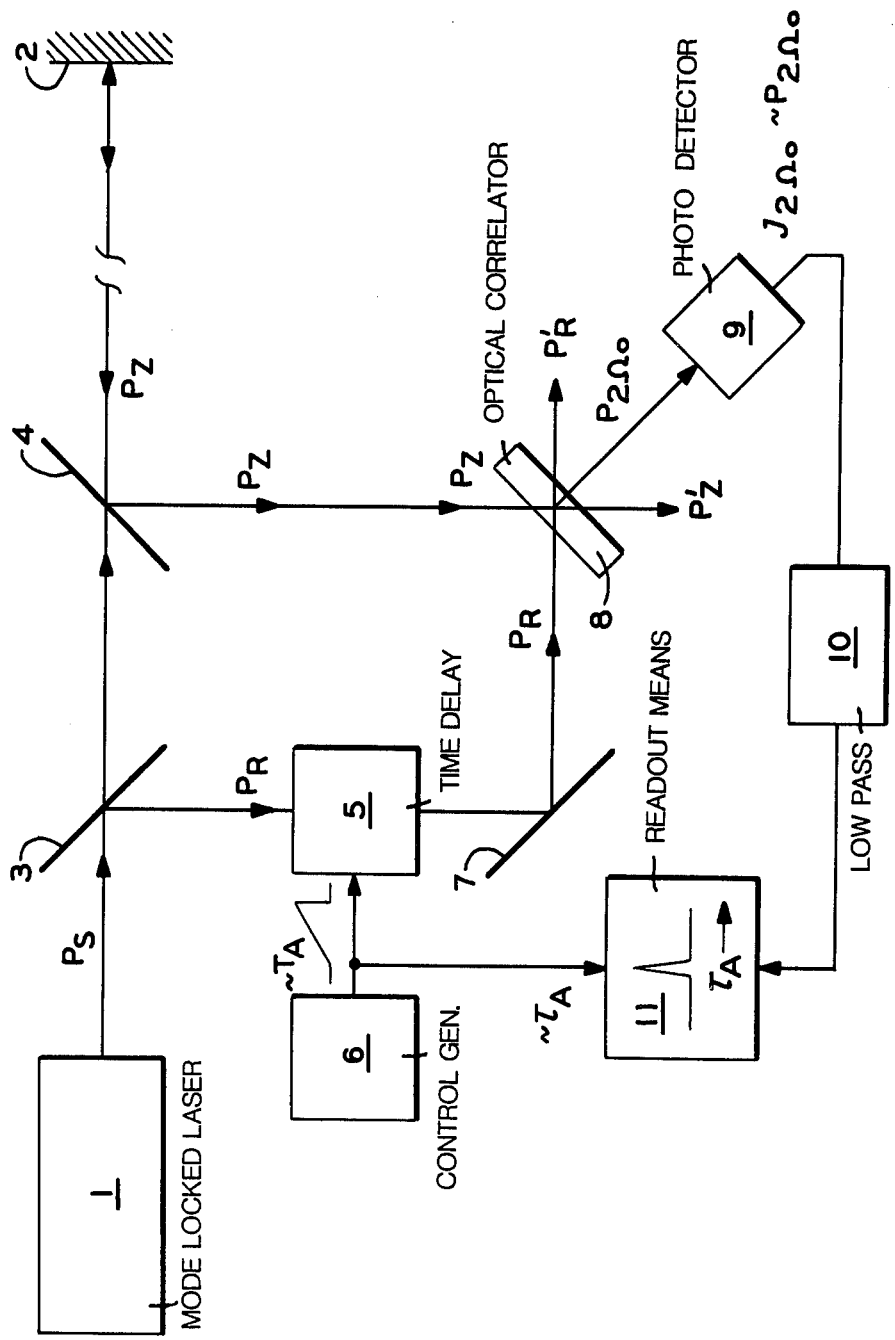
FIG. 1 is a block diagram of the basic construction of a laser range meter employing an optical cross correlator.

Reference numeral 1 in the Figures identifies a mode locked laser which serves as transmitter oscillator for radiating ultrashort pulses of carrier frequency $\Omega_0$ and radiation intensity $P_S$ at equal time intervals T in the direction of a target 2. Examples of mode locked laser are described in DeMaria et al, "Ultrakurze Laserimpulse—Werkzeuge fur die Forschung," *Umschau*, Vol. 72, p. 241 (Aug. 1972), both in the form of solid state lasers (ruby; $Nd^{3+}$:glass; $Nd^{3+}$:YAG) and in the form of gas lasers ($CO_2$:$N_2$:He; $N_2$; He-Ne; $Ar^+$). For example, it is possible to generate picosecond radiation pulses with peak radiation intensities in the gigawatt range with a mode locked $Nd^{3+}$:glass laser.

In the Q-Switched mode with mode locking, a laser oscillator is excited in the largest possible number N of longitudinal modes, and the optical resonator is modulated in synchronism with the differential frequency of adjacent longitudinal waveforms. Such tuned modulation can be obtained either actively (e.g., by means of a Kerr cell) or passively by means of an intensity controlled absorber within the laser resonator as described in the above identified article from Electronics and in Kleen et al, "Laser-Verstärkung durch Induzierte Emission," Springer-Verlag, Berlin, Heidelberg, New York (1969). This results in in-phase superimposition of the various waveforms according Fourier synthesis, and the laser emits an evenly spaced sequence of pulses at a repetition frequency $f_0$. If N waveforms of identical intensity $I_O$ are excited in the laser, then the formula for the radiation intensity $I_N$ as a function of time is:

$$I_N = I_O \frac{\sin^2 N\omega_O t/2}{\sin^2 \omega_O t/2}$$

The peak value of intensity thus increases with the square of the number N of longitudinal waveforms, $$I_N = N^2 I_0$$

whereas the 50% amplitude pulse duration $\Delta t_{\frac{1}{2}}$ varies inversely with the number N of waveforms, $$\Delta t_{\frac{1}{2}} = \frac{1}{N} T.$$

The shortest possible duration, $\text{Min}\Delta t_{\frac{1}{2}}$, of a single pulse is obviously reached when the maximum number of waveforms N is excited, i.e. the laser is excited throughout its complete laserable bandwidth, $2\Delta\Omega_0$, of atomic amplifier transitions. Inasmuch as the travel time $\tau$ of a transmitted pulse is linked to the target range A by the relation $$A = \frac{c}{2} \tau$$

the ultrashort pulse duration of the mode locked laser offers a range resolution of $$\delta A = \frac{c}{2} \delta \tau = \frac{c}{2} \Delta t$$

even under unfavorable signal/noise ratio conditions. For $\Delta t = 10^{-12}$s, range resolution is of an order of magnitude of $10^{-4}$m.

Along its path from laser 1 to target 2, the transmitted pulse passes through two beam splitters 3 and 4. Beam splitter 3 serves to feed a small percentage of the radiation intensity $P_S$ delivered by the transmitter into a receiver system in the form of a reference pulse $P_R$ to serve as a reference signal. The reference pulse is first applied to an optical time delay element 5 where it is delayed for a time period $\tau_A$ under the control of the output signal of a control generator 6. The delayed reference signal $P_R$ then reaches an optical correlator or nonlinear element 8 via a reflecting prism 7. The transmitted pulses passing through beam splitters 3 and 4 are returned by target 2, and the return pulses are reflected onto optical correlator 8 as measuring pulses $P_Z$ by beam splitter 4.

The optical time delay element 5 can be implemented by means of interferometer systems and laser amplifiers. Inasmuch as the consistency of the delay time set by generator 6 decisively determines the accuracy of the range measurements, active stabilization of the delay element by means of a reference oscillator may be required to suppress disturbing influences, if any. It is also possible to use optical fibers as time delay elements. Increases in pulse duration due to limited bandwidth of the optical fibers can be at least partially offset by means of optical pulse compression methods as described in the previously identified article by Fricke and in Lauberau et al, "Frequenzmodulation and Kompression ultrakurzer Lichtimpulse," Z. Naturforsch, Vol. 25a, p. 1626 (1970). Due to the low attenuation of optical fibers, delay paths of some $10^4$ km can be achieved, if necessary with the aid of intermediate laser amplifiers.

The time delay $\tau_A$ can be controlled or varied by means of control generator 6, provided the period $T_A$ is large in comparison with the time constant of the evaluation system shown as consisting of a photodetector 9, a low pass filter 10, and an oscilloscope or other readout means 11. Effective time delay control further depends on radiation of a large number of pulses by laser 1 during the period of the control voltage of control generator 6, with the time gap between individual transmitted pulses being longer than the maximum round trip travel time of the pulses to target and back.

Optical heterodyning of a measuring pulse $P_Z$ and a reference pulse $P_R$ within nonlinear element 8 can be achieved if both pulses arrive simultaneously, i.e. if the time delay $\tau_A$ of reference pulse $P_R$ is equal to the travel time $\tau$ of the measuring pulse to the target and back to the receiver. Under such conditions, $\tau_A$ is proportional to target range A.

Where either the two-photon-fluorescence (TPF) effect or the second harmonic generation (SHG) effect is utilized, the interaction of the laser radiation with the nonlinear element produces secondary radiation of a frequency $2\Omega_0$, or double the laser frequency. The output signal of the photodetector is a photoelectric current $I_2$ which is directly proportional to the average intensity $P_2\Omega_2$ of the secondary radiation. Because of the limited spatial and time resolution of the photodetector, it effectively integrates the secondary radiation to produce a photoelectric current given by the expression $$I_{2lo} = k \, P_{2lo}$$

where k represents the transmission constant of the photodetector at frequency $2\Omega_0$.

The parameters governing the relationships between the pulses radiated by the laser transmitter, the secondary radiation resulting from TPF or SHG effect and the characteristics of the nonlinear element are described in the previously identified articles by Rowe et al, Klauder et al, and Weber et al. Briefly, for the TPF effect, the secondary radiation intensity is proportional to the square of the incoming laser radiation intensity. The same is true for the SHG effect, provided the heterodyned components have identical planes of polarization (hereinafter referred to as SHG-I). On the other hand, if the planes of polarization of the measuring and reference pulses are orthogonal (hereinafter referred to as SHG-II), then the radiation intensity $P_2\Omega_0$ is proportional to the product of the components.

It can be proven that the output signal of the photodetector is determined by the cross correlation function of the intensity of the measuring and reference pulses. In addition, in the case of TPF detection, a contribution to the detector output current is provided by that percentage of fluorescence that is independent of travel time as a result of the periodicity of the electrical field strengths. The magnitude of the detector signal is a function of the travel time of the return pulse, and thus of the target range. Specifically, $$A = \frac{c}{2} \tau$$

where c is the velocity of light. Thus, an observation of the cross correlation function will permit determination of the target range A. The detector output current reaches its maximum value when the delay $\tau_A$ of the reference pulse coincides with the travel time $\tau$ of the measuring pulse.

The output signal of photodetector 9 is applied via a low pass filter 10, having a cutoff frequency in the order of 100 Hz, to the input of an oscillscope 11, the cathode ray of which is deflected in synchronism with the output voltage of control generator 6. This causes the appearance on the oscilloscope screen of a pulse at a position proportional to the travel time. Accordingly, target range A can be read directly from the screen if suitable calibration is provided. Readout of range can also be effected by other methods, e.g. by monitoring the photodetector output signal in response to changes in delay time of the time delay element. The delay time is adjusted by the output voltage of the control generator so that the maximum photodetector signal is obtained. The delay time set at the control generator is then proportional to the travel time of the measuring pulse, and thus indicative of target range.

If the SHG-II effect is used for cross correlation of measuring and reference pulses, a polarization selective divider prism is substituted for beam splitter 3 to provide orthogonal orientation of the planes of polarization of measuring and reference pulses. This embodiment is particularly well suited for pulse travel time and range measurement for the following reasons.

As noted, the detector output signal reaches its maximum when the time differential between the measuring and reference pulses reaches zero. The signal current decreases rapidly with increasing time differential. In the case of TPF and SHG-I detection, the minimum level corresponds to double the radiation intensity of the reference pulse. In the case of SHG-II detection, the minimum level is zero. Thus, the contrast ratio (i.e., the difference between maximum and minimum detector output signals) is better using SHG-II detection.

In addition, for a fixed maximum number of oscillation modes, SHG-II detection results in the smallest 3-db bandwidth of the detector output signal, i.e., a 3-db bandwidth which is only slightly wider than that of the laser pulse itself. Further, the 3-db bandwidth decreases with increasing values of N. If KDP crystals are used as the nonlinear elements, efficiencies between 20% and 30% can be achieved.

In the following description of the embodiments of FIGS. 2 and 3, it is assumed that detection will be according to the SHG-II method. Light pulses generated by the mode locked laser 1 are initially passed through an electro-optical filter 12 that filters one or several individual pulses out of a series of pulses, thus providing a well defined radiation characteristic. Gating of the laser pulses permits the measuring range to be varied as required. For proper measuring operation, only one pulse at a time should be traveling the distance to be measured. In conjunction with suitable excitation of the laser, the spacing of successive transmitted laser pulses can be greatly varied by the electro-optical filter 12 while maintaining very short duration of the individual pulses and resultant high resolution.

The radiation intensity can be increased to assure reliable correlation by the use of a first optical amplifier 13 following electro-optical filter 12 and of a second optical amplifier 14 at the input of the measuring channel. In addition to its amplifying function, optical amplifier 13 functions as a polarizer. A following polarization selective prism 15 is positioned at an angle of 45° from the plane of polarization of the light transmitted by amplifier 13 so as to split the light into two radiation components with orthogonal planes of polarization. As illustrated in FIGS. 2 and 3, the components comprise a measuring pulse $P_M$ polarized in the plane of the drawing and a reference pulse $P_R$ polarized perpendicular to the plane of the drawing. The planes of polarization are indicated by a double arrow for polarization in the plane of the drawing, and by a dot for polarization normal to the plane of the drawing.

Measuring pulse $P_M$ passes through beam splitter 4, is returned by target 2 as reflected pulse $P_Z$, and is subsequently transmitted to optical amplifier 14 by beam splitter 4. Amplified pulse $P_Z$ then passes through a beam splitter 16 to an optical filter 17 tuned to laser frequency $\Omega_0$.

Reference pulse $P_R$ produced by polarization selective prism 15 is delayed in time delay element 5, and is then also transmitted to optical filter 17 via a prism 31 and beam splitter 16. Thus, both reflected pulse $P_Z$ and reference pulse $P_R$ pass through optical filter 17 to reach a nonlinear crystal element 18 which emits radiation of double the laser frequency due to the SHG-II effect. The radiation emitted by crystal 18 is transmitted to a photodetector 19 through an optical filter 21 tuned to the second harmonic $2\Omega_0$ of the laser frequency. The electrical current output signal of photodetector 19 is supplied via an amplifier 22 and a low pass filter 20 to one input of a differential amplifier 23.

Figure 2:
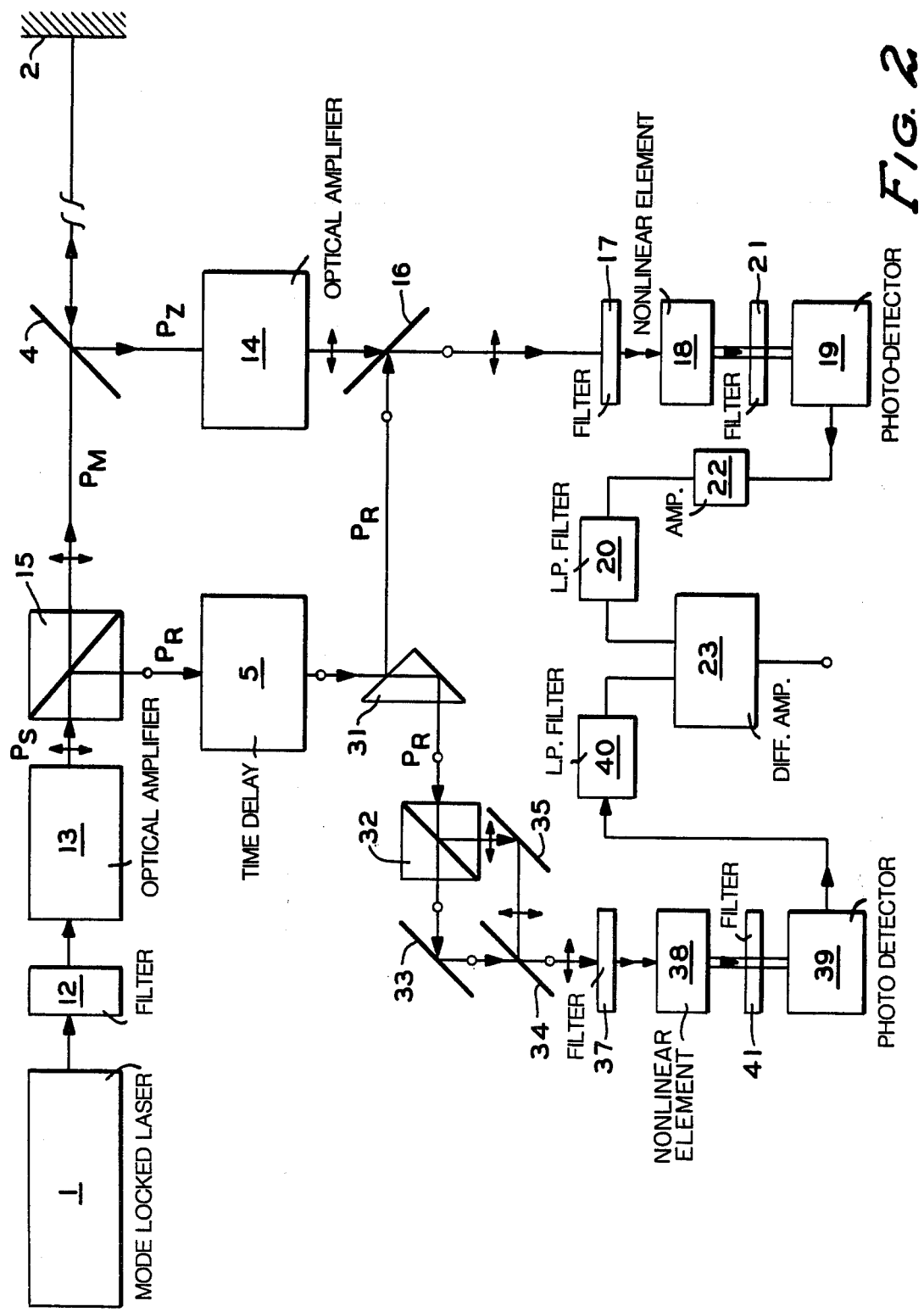
FIG. 2 is a block diagram of a laser range meter wherein cross correlation is accomplished by comparison of a signal traveling through a measuring channel with a signal traveling through a reference channel.
Figure 3:
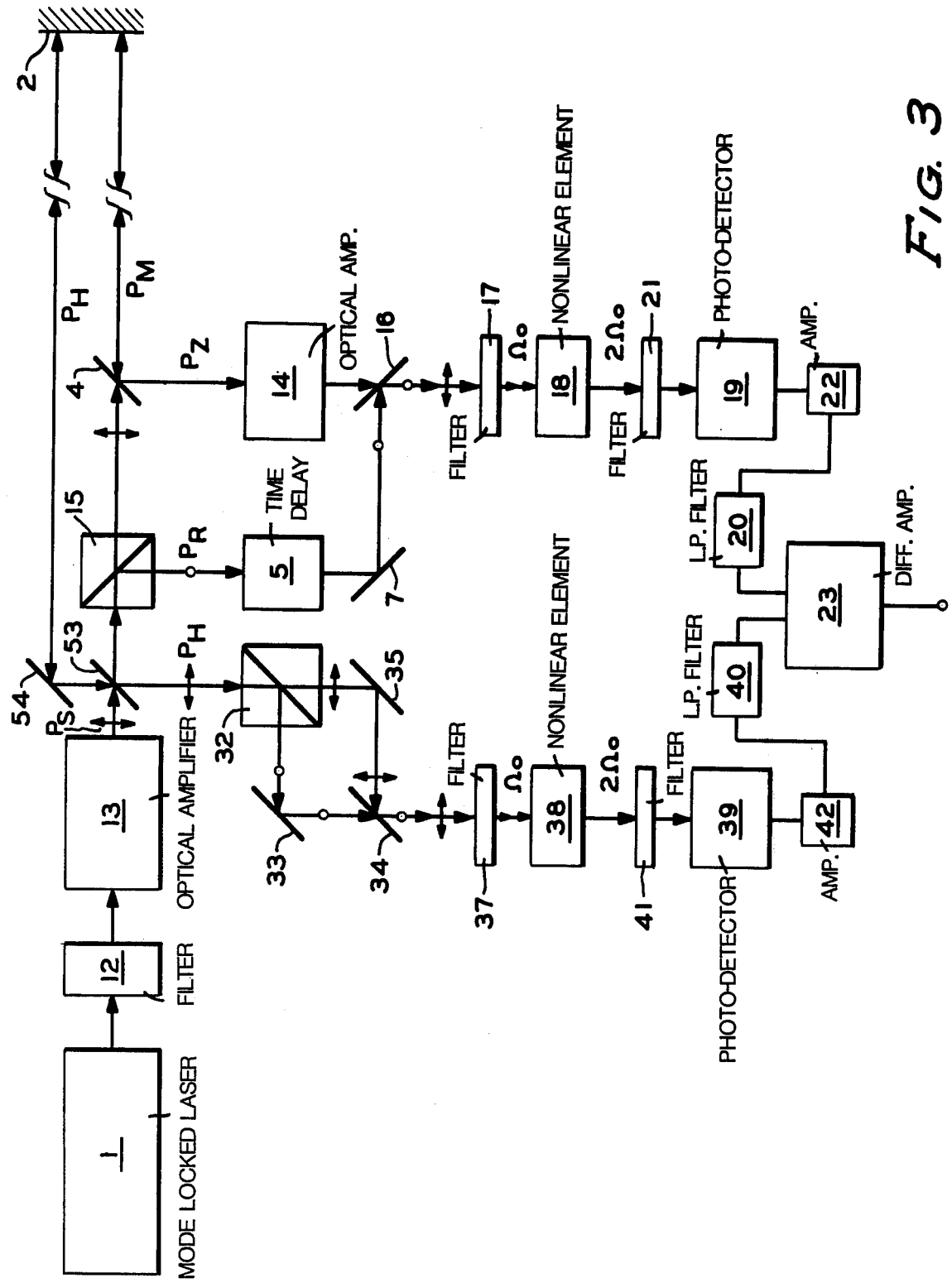
FIG. 3 shows a laser range meter similar to that of FIG. 2 configured to compensate for detrimental intensity variations of the optical signal.

In addition to the measuring channel, the embodiments of FIGS. 2 and 3 each include a reference channel. In FIG. 2, the reference channel receives its signal from prism 31. A portion of reference pulse $P_R$ reaches a second polarization selective prism 32 which is also positioned at an angle of 45° from the plane of polarization of the incoming pulse to provide two orthogonal components. The component polarized normal to the plane of the drawing is supplied to an optical filter 37 via a mirror 33 and a semitransparent mirror 34. The component polarized in the plane of the drawing is supplied to filter 37 via a mirror 35 and mirror 34. The orthogonally polarized pulses derived from reference pulse $P_R$ and passed through filter 37 are supplied to a nonlinear crystal element 38. Thus, they are subjected to the same cross correlation process in crystal 38 that the reference and measuring pulses are subjected to in crystal 18.

The reference channel likewise contains an optical filter 41 tuned to the second harmonic of the laser frequency. The signal passed by filter 41 is supplied to a photodetector 39, the output signal of which is supplied to a second input of differential amplifier 23 via a low pass filter 40. If the optical paths in the reference channel are identical, photodetector 39 produces maximum output current. The output current of photodetector 18 is maximum when the delay provided by time delay element 5 is equal to the round trip travel time of the measuring pulse. In that event, the output of differential amplifier 23 is at a minimum, indicating that the delay time at the time delay element 5 is proportional to the target range A and can be displayed in any suitable manner. Identical design of the correlators consisting of a nonlinear crystal and photodetector in each of the measuring channel and the reference channel assures that any influences which might detrimentally affect the characteristics of the correlators, such as aging, temperature, etc., will have the same effect in both channels and will be effectively cancelled out.

Use of the differential method and time delay adjustment to achieve operation whereby range is indicated by minimum output makes it feasible to offset detrimental variations of intensity of the optical signal. This is effected by the arrangement specifically illustrated in FIG. 3. As shown, a beam splitter 53 following amplifier 13 is used to form an auxiliary measuring pulse $P_H$ and direct it, by means of a mirror 54 toward target 2 parallel to the primary measuring pulse. The return of the auxiliary measuring pulse is reflected by mirror 54 through beam splitter 53 to polarization selective prism 32 where it comprises the input signal to the reference channel. The measuring channel and reference channel configurations are largely identical to those of FIG. 2. One minor difference is that the reference channel includes an amplifier 42 between photodetector 39 and low pass filter 40.

Reference signal $P_R$ is derived from the transmitted pulses by means of polarization selective prism 15. As previously described, the plane of polarization of the reference signal is orthogonal to that of the measuring signal, and the reference signal is delayed relative to the transmitted signal by means of time delay element 5. However, unlike the embodiment of FIG. 2, delay element 5 supplies a reference signal only to the measuring channel. Delay of the input signal $P_H$ in the reference channel is not required because it travels substantially the same path and receives the same delay as the measuring signal. Because of the spatial proximity of the paths travelled by signal pulses $P_M$ and $P_H$, any detrimental influence will modulate both pulses in a like manner so that any such influence is cancelled out at the output of differential amplifier 23.

To obtain a favorable signal-to-noise ratio at the range meter output, the secondary radiation intensity of the nonlinear crystals should be as high as possible. This can be achieved by phase matching, i.e. by selecting an appropriate angle between the incident laser radiation and the optical axis of the crystal, and further by optimizing the orientation of other axes of the crystal with respect to the polarization of the laser pulses.

The present range meter is insensitive to frequency shifts of the laser light. If it is desired to detect slow movements of a target, such detection can be achieved by a series of distance measurements.

Although several specific laser range meter embodiments have been shown and described for illustrative purposes, it will be apparent that other variations and embodiments are within the applicant's contemplation and teaching. It is not intended that coverage be limited to the disclosed embodiments, but only by the terms of the following claims.

The embodiments of the invention in which an exclusive property or right is claimed are defined as follows:

1. An improved laser range meter of the type having a laser transmitter for radiating a series of pulses of known frequency toward a target, and a receiver for receiving primary measuring pulses returned from the target in response to the transmitted pulses and determining the round trip travel time of individual primary measuring pulses, the receiver including means for deriving reference pulses from the transmitted pulses, variable optical delay means for delaying the reference pulses, a measuring channel comprising a first nonlinear element which responds to the primary measuring and delayed reference pulses by emitting secondary radiation at double the known frequency, and a first radiation detector for producing an electrical signal indicative of the intensity of radiation emitted by said first nonlinear element, the range meter further having readout means connected to receive the electrical signal produced by said first radiation detector, wherein the improvement comprises:

a mode locked laser serving as the laser transmitter for generating ultrashort high energy pulses of a pulse length which is at least two orders of magnitude shorter than the duration of secondary radiation emitted by said first nonlinear element, the intensity of said secondary radiation being representative of the time correlation of corresponding primary measuring pulses and delayed reference pulses; and a reference channel in the receiver connected to receive delayed pulses derived from the transmitted pulses, said reference channel including a second nonlinear element for emitting radiation at double the known frequency in response to the delayed pulses and a second radiation detector for supplying an electrical signal indicative of the intensity of radiation emitted by said second nonlinear element to said readout means.

2. The laser range meter of claim 1 wherein said first and second nonlinear elements each comprise a second harmonic frequency generation crystal.

3. The laser range meter of claim 2 including polarization means for orthogonally polarizing the measuring and reference pulses relative to one another.

4. The laser range meter of claim 3 wherein said means for deriving reference pulses comprises a first polarization selective prism which orthogonally polarizes the measuring and reference pulses with respect to one another.

5. The laser range meter of claim 4 wherein
a differential amplifier is connected to receive the output signals of said reference channel and said measuring channel.

6. The laser range meter of claim 5 wherein:
said reference channel further includes a second polarization selective prism which produces two orthogonally polarized reference signal components; and
combining means is provided for supplying both orthogonally related components to said second nonlinear element.

7. The laser range meter of claim 1 wherein auxiliary measuring pulses are derived from the transmitted pulses and are radiated toward the target parallel to the primary measuring pulses, and said delayed pulses are returned from the target in response to the auxiliary measuring pulses and are supplied to said second nonlinear element.

8. The laser range meter of claim 7 wherein
a differential amplifier is provided for producing an output signal indicative of the difference between the electrical output signals of said reference channel and said measuring channel.

9. An improved laser range meter of the type having a mode locked laser transmitter for radiating a series of ultrashort, high energy pulses of known frequency toward a target and a receiver for receiving primary measuring pulses returned from the target in response to the transmitted pulses, the receiver including means for determining the round trip travel time of individual primary measuring pulses, wherein the improvement comprises:
means for deriving reference pulses from the transmitted pulses;
optical delay means for delaying the reference pulses;
a measuring channel including a first nonlinear element arranged to receive the primary measuring and delayed reference pulses and operable to emit secondary radiation at double the known frequency and at an intensity representative of the time correlation of corresponding primary measuring pulses and delayed reference pulses, said measuring channel further including a first radiation detector for producing an electrical output signal indicative of the intensity of radiation emitted by said first nonlinear element;
a reference channel including a second nonlinear element for emitting radiation at double the known frequency in response to the reference pulses, and including a second radiation detector for producing an electrical output signal indicative of the intensity of radiation emitted by said second nonlinear element; and
readout means including a differential amplifier connected to receive the output signals of said reference channel and said measuring channel.

10. The laser range meter of claim 9 wherein:
said means for deriving reference pulses comprises a first polarization selective prism which orthogonally polarizes the measuring and reference pulses with respect to one another; and
said reference channel further includes a second polarization selective prism which produces two orthogonally polarized reference signal components, and combining means for supplying both orthogonally related components to said second nonlinear element.

11. The laser range meter of claim 9 wherein auxiliary measuring pulses are derived from the transmitted pulses and are radiated toward the target parallel to the primary measuring pulses, and pulses returned from the target in response to the auxiliary measuring pulses are supplied to said reference channel as the reference pulses.

12. The laser range meter of claim 11 wherein said first and second nonlinear elements comprise a fluorescent dye which emits radiation in accordance with the two-photon-fluorescence effect.

13. The laser range meter of claim 12 wherein the fluorescent dye is Rhodamin 6G in ethyl alcohol.

14. The laser range meter of claim 12 wherein the fluorescent dye is Rhodamin 6G in 1,2,5,6-dibenyanthrazen.

15. The laser range meter of claim 11 wherein said first and second nonlinear elements each comprise a second harmonic generation crystal.

* * * * *

UNITED STATES PATENT AND TRADEMARK OFFICE
CERTIFICATE OF CORRECTION

PATENT NO. : 4,413,905
DATED      : NOVEMBER 8, 1983
INVENTOR(S) : WOLFGANG HOLZAPFEL

It is certified that error appears in the above-identified patent and that said Letters Patent is hereby corrected as shown below:

Cover page, lefthand column, line 4, after "Assignee:"

delete "Honeywell Inc., Minneapolis, Minn."

substitute --Honeywell GmbH, Offenbach, West Germany--.

Signed and Sealed this

Twenty-fourth Day of July 1984

[SEAL]

Attest:

GERALD J. MOSSINGHOFF

Attesting Officer     Commissioner of Patents and Trademarks